United States Patent Office 3,093,177
Patented June 11, 1963

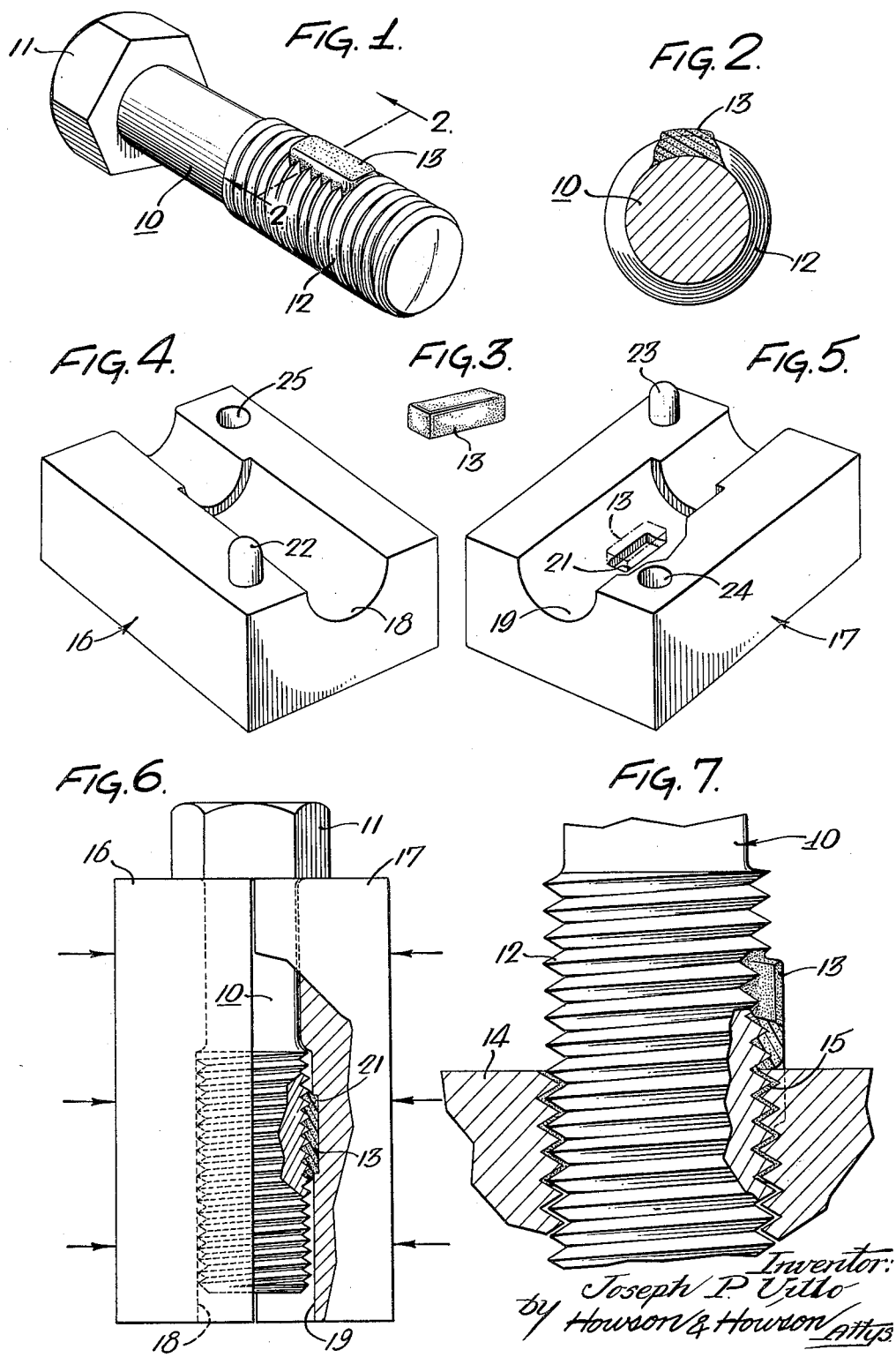

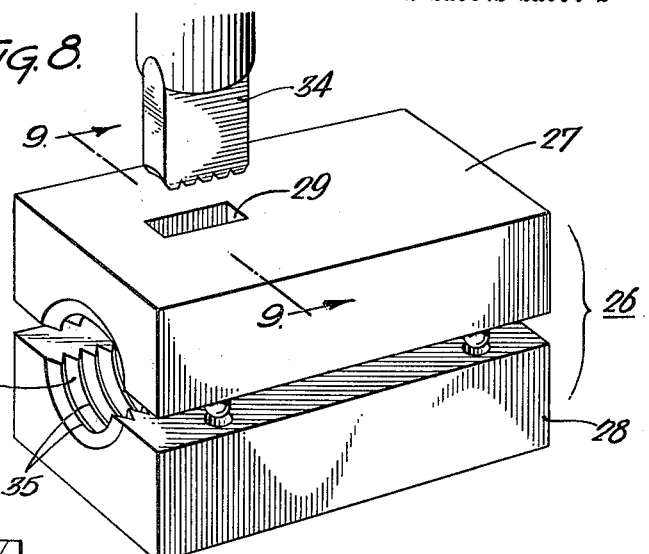
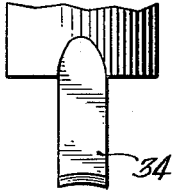
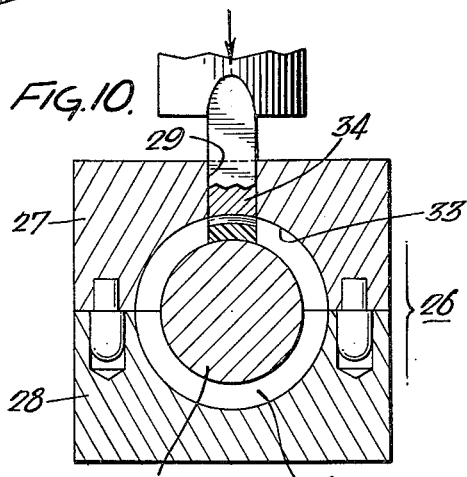
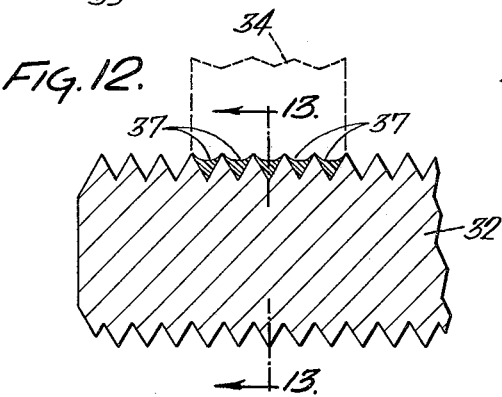
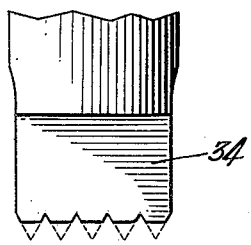
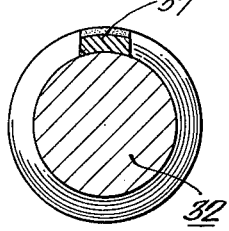

3,093,177
THREAD LOCK AND METHOD OF MAKING THE SAME
Joseph P. Villo, Glenside Gardens, Pa., assignor to Standard Pressed Steel Co., Jenkintown, Pa., a corporation of Pennsylvania
Filed Nov. 8, 1957, Ser. No. 696,014
2 Claims. (Cl. 151—7)

The present invention relates to new and useful improvements in thread locks and methods of making the same, and particularly to new and useful improvements in thread locks employing a plastic or distortable material fixed to the thread and covering a predetermined portion of the thread area so as to interfere with the normal meshing of the thread with one of complementary form and, when the threads have attained the intermeshed relation, to lock them securely against inadvertent release.

This invention is based upon the discovery that plastic materials having certain physical properties, hereinafter specifically defined, when superimposed upon a portion of a thread surface in adequate thickness to insure pressure contact with the confronting surface of a complementary thread, are capable of producing a pronounced locking effect between the threads resisting relative angular displacement about the thread axis; and that the locking effect thus obtained my remain effective after a number of forcible separations and rematings of the elements.

For maximum effectiveness, it is necessary that a material for the purposes set forth have the ability to adhere or bond strongly to the surface of the threads and to be effectively secured to the surface in a layer or mass of sufficient thickness without the use of any bonding or adhesive agent. The material also must possess sufficient toughness and cohesiveness and the ability to be distorted under high pressures without breaking the bond between the material and the surface of the threads. In addition, the material should also have high frictional properties without abrasiveness; and be chemically inert with respect at least to the particular environment in which it is used.

One material which meets the essential requirements and which when properly applied to a screw thread will provide a thread lock adequate for commercial purposes is polyamide (nylon type) resins. I have discovered that these resins may be adhered to the threaded surface of a bolt without the use of any bonding or adhesive agent and, by the method of the present invention, nylon material of this type may be bonded to the thread surfaces with a strong enough bond so that it will not be separated from the thread surfaces when the material is distorted by extremely high pressures. In addition, this material possesses the desired properties of toughness and cohesiveness, yet may be readily distorted; these resins also possess the desired frictional properties without tackiness to provide a sufficiently strong thread lock, yet is not abrasive and will not exert any undue amount of wear on the thread surfaces. Also, this material is chemically inert with respect to the material of the threaded members and thus will not deteriorate or change properties while in use.

Since the locking function has no deleterious effect upon the basic structure of the thread, the thread lock of this invention lends itself to renewal if extended use has reduced the locking efficiency to an undesirable extent.

With the foregoing in mind the principal object of the present invention is to provide a thread lock of universal application having advantages of extreme simplicity of form and relative economy of production and which will require no departure structurally from the conventional thread form.

Another object of the present invention is to provide a thread lock which will perform its function without distortion and without mutilating the mating threads.

A further object of the present invention is to provide a novel thread lock and method of making the same which is capable of repeated forcible separations and rematings with a threaded member without destroying the effectiveness of the thread lock.

Still a further object of the present invention is to provide a method of making a thread lock having the features and characteristics set forth above wherein the locking material may be securely bonded to the thread surface by a relatively simple and inexpensive operation.

These and other objects of the present invention and the various features and details of the operation and construction thereof are hereinafter more fully set forth and described with reference to the accompanying drawings, in which:

FIG. 1 is a perspective view of a lock bolt made in accordance with the present invention;

FIG. 2 is an enlarged transverse sectional view of the lock bolt taken on line 2—2, FIG. 1, illustrating the position of the locking material on the bolt;

FIG. 3 is a perspective view of a pellet of distortable locking material prior to application to the bolt;

FIGS. 4 and 5 are perspective views of the two die members used in carrying out the method of the present invention wherein the pellet of distortable material is securely bonded to the threaded portion of the bolt;

FIG. 6 is a side elevational view partially in section illustrating the bolt, pellet, and die members during the bonding operation;

FIG. 7 is an enlarged fragmentary longitudinal sectional view illustrating the distortion of the pellet of locking material and the locking action upon the initial insertion of the lock bolt of the present invention into a threaded member;

FIG. 8 is a view in perspective of a modified die for carrying out the method of this invention;

FIG. 9 is a sectional view on the line 9—9, FIG. 8;

FIG. 10 is a sectional view similar to FIG. 9 but showing the die closed, the work screw in place, and the plunger in advanced operative position;

FIG. 11 is an enlarged fragmentary side view of the plunger;

FIG. 12 is a sectional view showing the plunger in operative pressure engagement with the plastic material and pressing the material against the thread; and FIG. 13 is a sectional view on the line 13—13, FIG. 12.

In the drawings, the thread lock illustrated is applied to a lock bolt. However, it will be apparent that the thread lock of the present invention and the method of forming the same may be applied to any threaded surface.

Referring more specifically to the drawings and particularly FIGS. 1 and 2 thereof, reference numeral 10 designates generally a lock bolt having a head 11 and a threaded portion 12 to which the thread lock of the present invention is applied. Securely bonded to the thread portion 12 of the bolt is a pellet 13 of a plastic or distortable material, which may consist, for example, of a polyamide (nylon type)

resin. The pellet 13 preferably is of generally rectangular shape with its longest axis extending longitudinally of the bolt. It is to be understood, however, that the pellet may be of any desired shape and size. The extent of the thread area covered by the pellet 13 and the amount of material applied to the threads may vary with the degree of locking action required. In general, however, the pellet 13, as initially applied to the threads, covers a minor portion of the entire threaded surface and extends from the root of the threads to a point beyond the tip of the threads.

Upon insertion of the bolt 10 into a threaded member 14, for example as illustrated in FIG. 7, the pellet 13 is permanently distorted upon engagement with the threads of the member 14 and is spread about the periphery of the threaded portion of the bolt in the form of a thin layer of material 15. This spread layer of material fills the clearance space between the threads of the bolt 10 and the member 14 and provides an effective thread lock. With the plastic material securely bonded to the bolt 10, as set forth hereinafter, the bond between the two is not broken upon distortion of the plastic material under pressure and the bolt may be repeatedly separated from and reinserted into the member 14 without destroying the effectiveness of the thread lock.

In torque tests of this type of thread lock made on a number of 5/16–24 bolts, wherein the maximum allowable torque on the first removal is 60-inch pounds, and the minimum allowable torque on the fifteenth removal is 6.3-inch pounds; the bolts having the thread lock of the present invention required an average of approximately 25-inch pounds of torque for the first removal. At the end of the fifteenth cycle of insertion and removal, these bolts required an average of approximately 10-inch pounds of torque for removal. The maximum and minimum torques in each instance were consistent and well within the range of permissible tolerances under which commercial threads of the type under test are produced.

Rigid vibration tests on this same type of bolt showed a remarkable ability of the thread lock to resist release, there being a consistent failure of the threaded elements in advance of any material relative displacement of the bolt with respect to the member in which the bolt is threaded. The vibration tests followed required three and one-half hours of vibration time on a 5/16–24 bolt. In the tests on the bolts of the present invention after four hours of vibration time, there was no relative displacement of the threads.

In the manufacture of the thread lock of the present invention, a combination of heat and pressure is used to securely bond the plastic material, such as for example, a polyamide (nylon type) resin, to the thread area. With this bonding process, as set forth hereinafter, the locking material is bonded to the thread area with a bond strong enough to resist release upon distortion of the pellet of locking material under the high pressures present when the thread area is initially engaged by a complementary thread.

With reference to FIGS. 4, 5 and 6, a pair mating die members 16 and 17, formed for example as shown in FIGS. 4 and 5, respectively, are used in the process of bonding the pellet 13 to the bolt threads. Each die member 16 and 17 contains a generally semi-cylindrical die cavity 18 and 19, respectively, corresponding to the diameter of the threaded portion of the bolt and within which the threaded portion of the bolt is engaged. The die cavity 19, in turn, has a separate pellet cavity 21 formed therein within which the pellet 13 is placed, as illustrated in broken lines in FIG. 5, prior to the bonding operation. The pellet cavity 21 corresponds generally to the configuration of the pellet 13 and has a depth of smaller dimensions than the thickness of the pellet, so that the pellet 13 projects upwardly from the pellet cavity into the die cavity 19 a distance at least equal to the depth of the bolt threads. To insure proper positioning of the die members and prevent lateral displacement of the members relative to one another, each die member 16 and 17 has secured thereto a positioning pin 22 and 23, respectively, adapted to be received within openings 24 and 25, respectively, of the opposite die member.

At the beginning of the process for bonding the pellet 13 to the threaded portion 12 of the bolt 10, a pellet 13 is inserted into the pellet cavity 21 with the pellet engaging the bottom of the pellet cavity and extending beyond the wall of the cavity 21 into the die cavity 19 a distance at least equal to the depth of the threads of the bolt to which it is to be bonded. Also, the pellet is dimensioned so that the side walls of the pellet cavity embrace the lower portion of the side edges of the pellet. The bolt is then positioned in the die 17 with the threaded portion received within the die cavity in engagement with the pellet and the pellet spaced from the leading end of the threads. The opposite die member 13 is then positioned in confronting relation with the die member 17 in engagement with the threaded portion of the bolt.

To complete the bonding process, heat and pressure are applied simultaneously to the pellet to thereby securely bond the pellet to the threaded portion of the bolt. Heat may be applied in any desired manner such as, for example, placing the die members, pellet and bolt in a furnace or heated area, applying a frame directly to the various elements, or the die members may be heated electrically. When using a polyamide (nylon type) resin as set forth above for the pellet material, care must be taken that the pellet is not raised above that temperature which will permanently alter the properties of the pellet material.

Simulaneously with the heating of the pellet, pressure is exerted transversely on the die members as illustrated in FIG. 6 to embed the threads of the bolt into the pellet with the pellet material engaging the root portion of the thread and to securely bond the pellet to the bolt. I have found, for example, that a pressure approximately 100 pounds per square inch exerted on the pellet will accomplish this result, but the pressure may vary widely. This combination of heat and pressure causes the threads of the bolt to become embedded in the pellet material with the pellet material in contact with the root portions of the threads adjacent the area of contact of the threaded portion of the bolt with the pellet and also securedly bonds the pellet to the bolt.

This above process creates an extremely strong bond between the pellet and the bolt which successfully resists separation under the high pressures and deformation present when the lock bolt is threaded into a mating member.

In a preferred procedure in accordance with the invention, I may employ apparatus of the character shown in FIG. 8 and 9 of the drawings. In this case a die 26 having separable complementary parts 27 and 28, is used, this die corresponding to the die illustrated in FIGS. 4, 5 and 6 except that in this instance the pellet cavity 21 is replaced by an aperture 29 which extends completely through the wall of the die. Through this aperture, a nylon pellet 31 is brought into pressure engagement with the surface of a threaded element 32, previously inserted in the die cavity 33, by means of a plunger 34 corresponding closely in size and shape to the aperture 29. Preferably the cavity 33 is provided with a female thread 35 complementary to the thread of the inserted element 32, and in any case the element will fit closely within the said cavity. The pellet 31, while not necessarily conforming originally to the shape of the aperture, will have a volumetric size sufficient to fill or partially fill the thread recesses exposed in the latter so that the pressure of the plunger may be applied to the pellet to press it forcibly against the surfaces of the thread.

Preparatory to insertion of the threaded work element 32 in the die, or subsequently as hereinafter explained, the element is heated to a temperature such that when the nylon pellet is forcibly pressed against it by the plunger action described above and as shown in FIG. 10, the temperature of the element in the contact area will exceed the melting temperature of the nylon. The pressure is maintained after application until the temperature in the pellet contact area has dropped well below the said melting temperature, and this step in the procedure may be expedited by use of a fluid coolant, such for example as a jet of cooling air projected from a nozzle against the die.

The pressure exerted by the plunger, which may to advantage be of the order of one hundred pounds per square inch, more or less, forces the pellet by deformation into the thread of the work element to the full extent of the thread depth so that the full pressure of the plunger may be applied to press the nylon material against the flank faces of the thread and to hold the pressure during the cooling period. The terminal or working face of the plunger may be concaved to conform in shape to the cylindrical contour of the work element, see FIG. 9, or it may be flat, but preferably it will be recessed or channeled to conform to the thread form of said element as shown in FIG. 11. When the end of the plunger is plane the nylon pellet material will fill the thread interstices and extend at least to the apices of the thread of the work element. When the end of the plunger is recessed the nylon will be confined between the flanks of the threads as shown at 37 in FIGS. 12 and 13. In any case the nylon will in effect be permanently fused or bonded to the thread surfaces with a strength precluding displacement at the bonded surfaces by the shearing action of a complementary thread with which the work element may be mated.

Nylon resin as produced by E. I. du Pont de Nemours & Co. and sold under the trade name of "Zytel" is well suited for practice of this invention. The resin is available in extruded strip form of cross sectional size and shape suitable for dividing into individual pellet form. Du Pont "Zytel" resin, typical of the broad class of nylon resins, is produced as molding or extruding powder in a plurality of grades differing in properties to meet special requirements. The physical properties of the different grades, identified by number, have been widely publicized and are well known in industry. They are described specifically in a paper presented to the American Society of Mechanical Engineers at Cleveland, Ohio, on June 18, 1956; in a publication of E. I. du Pont de Nemours & Co. (Inc.), copyrighted in 1954 and entitled "Zytel"; and in numerous bulletins issued by the Polychemicals department of that company. While nylon in general will, in some practical degree at least, meet the requirements of the invention, I have found that optimum results are obtainable with "Zytel" resins 33, 101 and 211, and the first of these is preferred. As affecting the practice of this invention, but in no critical sense, it may be noted that the resins differ somewhat in melting temperatures, and by way of example the approximate melting point ranges of the three resins specifically mentioned are respectively (33) 405°–425° F., (101) 475°–495° F., and (211) 390°–425° F. The recommended extrusion temperatures are somewhat higher than the melting temperatures, for example, in the three specified resins: (33) 450° to 550° F., (101) 500°–600° F., and (211) 450°–550° F. In practice of the present invention, the temperature of the threaded surface to which the nylon is to be applied will at the moment of contact be in excess of the melting point of the nylon and, suitably within the specified extrusion range. The temperature may substantially exceed that range without apparent deleterious affect upon the nylon or the bond between the nylon and the threaded surface, but there appears to be no advantage in the higher temperatures and they will eventually result in burning and frothing of the nylon and loss of torque.

In practicing the invention with bolts of one quarter inch or larger, I have found that the bolt has sufficient mass in itself to retain the required temperature for the fusion operation during and after transfer to the die. For bolts under one quarter inch in diameter, or for threaded fasteners of equivalent mass. I prefer to insert the bolt in the die before heating and to heat both the die and the screw. In this case I prefer to use an aluminum die or one of other highly conductive metal.

In a typical example of the method using Zytel 33, a one quarter inch bolt is given a hot alkali wash to remove oil and is then heated to 475° F. in a Lepel electric heater. The bolt is then transferred to the die, the nylon pellet is forcibly pressed against the thread by the plunger. The pressure is maintained while the screw is cooled to 350°. The screw is then removed from the die and treated as conventionally for rust prevention.

I have found it practicable also to cadmium plate the fastener after application of the nylon to the thread. The procedure is essentially the same as that described above except that, after the hot alkali wash, the fastener is pickled (muriatic acid) to remove scale, is then successively rinsed, electro cleaned, rinsed and dried before being heated to the required temperature for the nylon installation. The fasteners are then plated by conventional methods.

In a typical example of the locking torque characteristics obtainable by practice of my invention, a 5/16–18 x 7/8 socket head cap screw treated with Zytel 33 nylon as described above and showing a maximum torque when initially installed in a complementary female thread of 40 inch pounds; exhibited a starting first removal torque of 35 inch pounds and a starting removal torque on the fifteenth removal of 26 inch pounds. Materially higher corresponding torques were obtained with Zytel 211 nylon composition on like screws and similar conditions; and slightly higher corresponding torques with Zytel 101.

I have found it possible also to adhere the nylon to the thread over the cadmium plate by the method herein described but, as a means for improving the strength of the bond, I prefer to prepare the cadmium surface for reception of the nylon by treatment with a zinc-iron or like phosphate (known in the trade as Bonderite) which acts mechanically to provide a base better suited than the cadmium to the production of a strong union with the nylon.

From the foregoing it will be apparent that the present invention provides a thread lock of universal application having advantages of extreme simplicity of form and relative economy of production. In addition, it is apparent that the present invention provides a novel thread lock and method of making the same which is capable of repeated forcible separations and rematings with a complementary threaded member without destroying the effectiveness of the thread lock and which will not distort or mutilate the threads of the mating member. Further, the present invention provides a novel method of securely bonding the locking material to a thread area to provide a thread lock bolt which may be accomplished by a relatively simple and inexpensive operation.

While particular embodiments of the present invention have been illustrated and described herein, it is not intended to limit the invention to such a disclosure, and changes and modifications may be incorporated and embodied therein within the scope of the following claims. It will be understood also that in commercial practice the method of production would be carried out by automatic machinery without material departure, however, from the principle described above.

This application is a continuation-in-part of my earlier application Serial Number 562,070, filed January 30, 1956, for "Thread Lock and Method of Making the Same," which is now abandoned.

I claim:

1. A self-locking threaded fastener element wherein the self-locking characteristic is derived from a nylon plastic composition having fused juncture with a surface of the thread, said plastic being confined to a local circumferential and axial area of the thread, and being bound to the thread solely by said fused juncture.

2. A self-locking fastener according to claim 1 wherein the thread is of standard form and the said juncture is with plain unmodified surface of said thread.

References Cited in the file of this patent

UNITED STATES PATENTS

| | | |
|---|---|---|
| 1,071,841 | Whitman | Sept. 2, 1913 |
| 1,368,087 | Woodward | Feb. 8, 1921 |
| 2,330,333 | Brubaker | Sept. 28, 1943 |
| 2,539,887 | Boots | Jan. 30, 1951 |
| 2,631,871 | Stone | Mar. 17, 1953 |
| 2,687,975 | Skurka | Aug. 31, 1954 |
| 2,741,288 | Johnson | Apr. 10, 1956 |
| 2,815,787 | Podell | Dec. 10, 1957 |
| 2,823,724 | Gill | Feb. 18, 1958 |

FOREIGN PATENTS

| | | |
|---|---|---|
| 690,770 | Great Britain | Apr. 29, 1957 |